United States Patent [19]

Okuyama

[11] 3,907,418
[45] Sept. 23, 1975

[54] FRAME SHIFTING DEVICE FOR A READER-PRINTER FOR A MICROFILM

[75] Inventor: Susumu Okuyama, Tokyo, Japan
[73] Assignee: Ricoh Co., Ltd., Tokyo, Japan
[22] Filed: Mar. 4, 1974
[21] Appl. No.: 447,632

[30] Foreign Application Priority Data
Mar. 5, 1973   Japan.............................. 48-25826

[52] U.S. Cl. ........................ 353/77; 353/74; 355/3; 355/5; 355/10
[51] Int. Cl.² .................... G03B 27/00; G03B 21/28
[58] Field of Search .......... 353/77, 79, 82, 122, 26, 353/27, 71, 73, 74; 355/5, 3, 11, 10, 7

[56] References Cited
UNITED STATES PATENTS

| | | | |
|---|---|---|---|
| 2,377,476 | 6/1945 | Berglund............................. | 353/79 |
| 3,511,564 | 5/1970 | Gawin et al......................... | 353/77 |
| 3,738,744 | 6/1973 | Cassano et al..................... | 355/5 X |

Primary Examiner—Richard E. Aegerter
Assistant Examiner—Larry Jones
Attorney, Agent, or Firm—Cooper, Dunham, Clark, Griffin & Moran

[57] ABSTRACT

A device comprising a mechanism for automatically rotating an image rotating prism conjointly with the movement of a movable reflector adapted to move between a first position in which a picture of the microfilm frame containing desired information is projected on a screen and a second position in which the picture of the frame is duplicated on a photosensitive sheet, and means for rendering the prism rotating mechanism operative or inoperative depending on whether the major axis of the frame containing desired information of the microfilm is disposed vertically or transversely. Thus, the device enables the desired frame of the microfilm to be automatically changed from a position in which the major axis of the frame is disposed vertically to a position in which the major axis is disposed transversely or vice versa for enlargement and duplication of the desired information in the frame.

4 Claims, 10 Drawing Figures

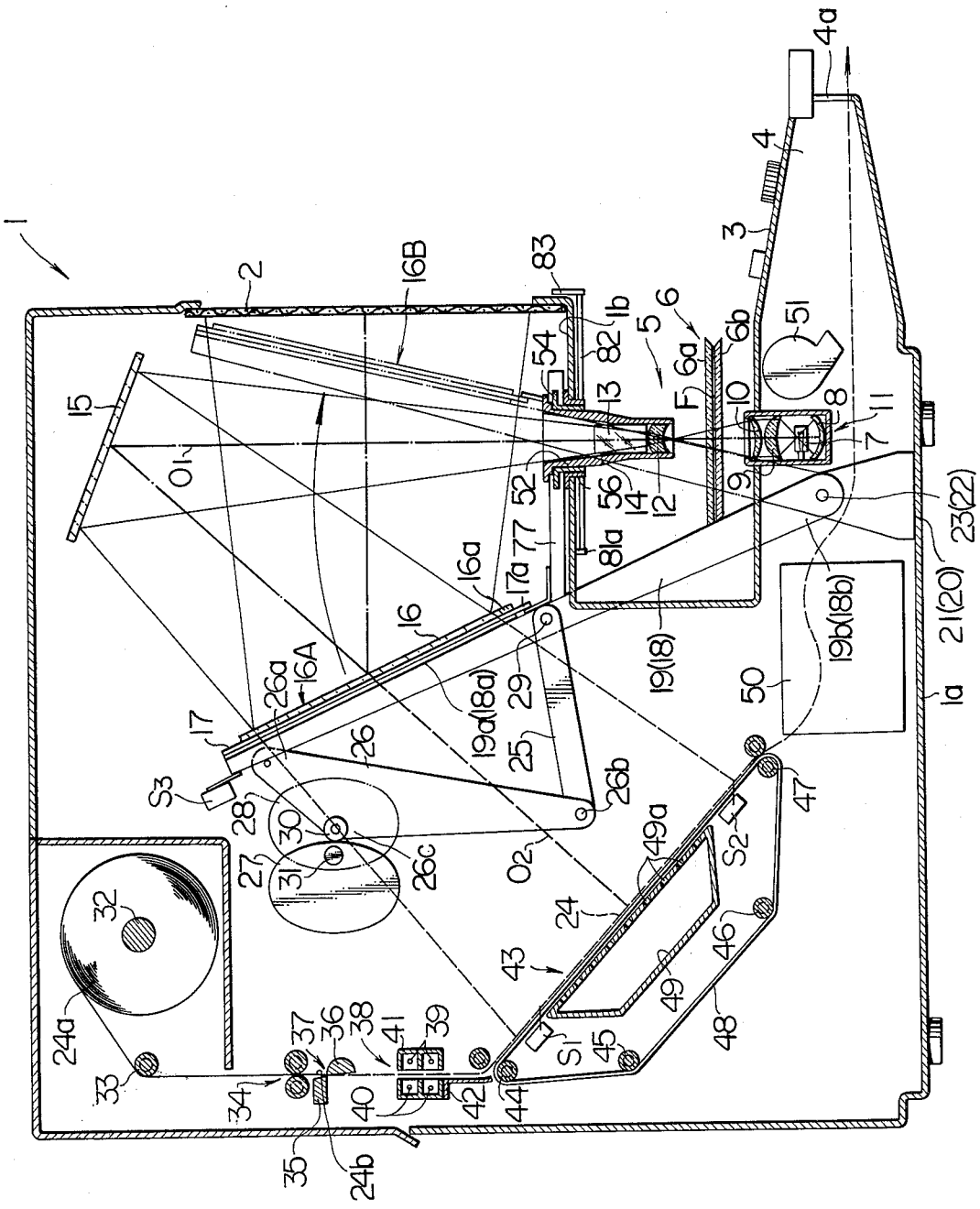

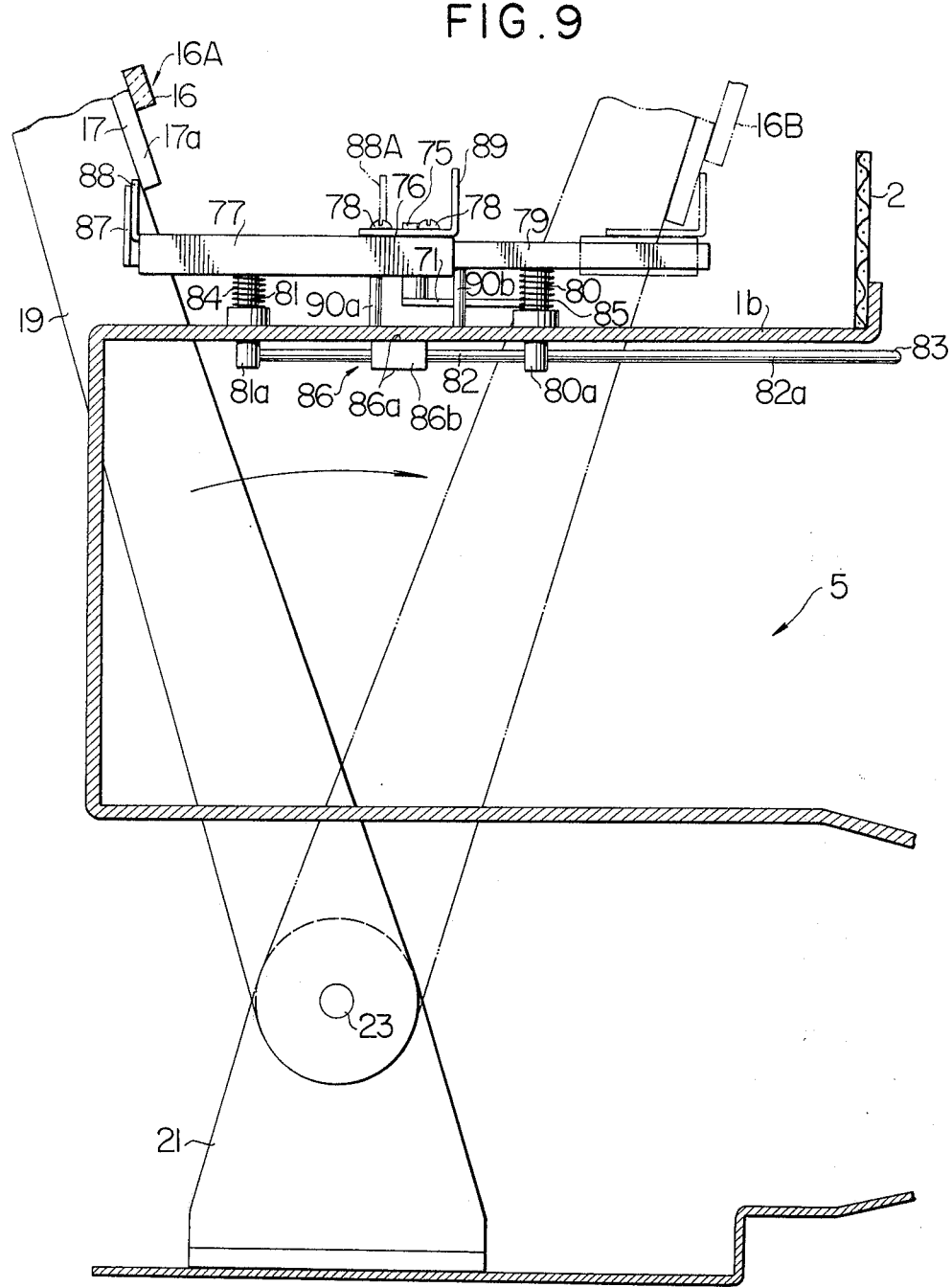

FRAME SHIFTING DEVICE FOR A READER-PRINTER FOR A MICROFILM

BACKGROUND OF THE INVENTION

This invention relates to a device in which a frame of a microfilm in roll form or a microfiche is enlarged for producing a duplicate of the desired information on a photosensitive sheet by means of a reader-printer.

Information is recorded in a microfilm or microfiche (hereinafter referred to as a microfilm) in a reduced size, and a reader-printer is employed when it is desired to read a desired piece of information recorded in one of the frames of the microfilm or produce a duplicate of the information by enlarging the frame.

Microfilms which can be used with a reader-printer are now available in two forms: one form is microfilms in roll form and the other is microfiches in sheet form. In either form, there are two types of frames of film in which information is recorded in reduced form: in one type the major axis of each frame is disposed vertically and in the other type the major axis each frame is disposed transversely. More specifically, a microfiche 67 shown in FIG. 5 includes frames each containing a piece of information and having a major axis disposed vertically, while a microfiche 68 shown in FIG. 6 includes frames each containing a piece of information and having a major axis disposed transversely. In FIG. 7, there is shown a microfilm in roll form 69 having frames each having a major axis disposed vertically, and in FIG. 8, there is shown a microfilm in roll form 70 having frames each having a major axis disposed transversely. Thus, the frames of the microfilm are rectangular in form, but the information recorded in each frame is an upright image regardless of whether the major axis of the rectangle of the frame is disposed vertically or transversely.

When the microfilm 67 or 69 shown in FIG. 5 or FIG. 7 is mounted in a reader-printer and the frame in which desired information is recorded is enlarged and projected for observation, the projected picture forms an upright image in an area defined by marks 2a and 2d on a screen 2 in FIG. 2 and having a major axis disposed vertically. On the other hand, when a film 68 or 70 shown in FIG. 6 or 8 is mounted in a film holder and a picture of the frame containing desired information is thrown upon the screen 2 by being enlarged, an upright image is formed in an area defined by marks 2ao to 2do on the screen 2 and having a major axis disposed transversely. There is no problem when the pictures of information recorded in the frames are enlarged and projected upon the screen for observation.

However, when it is desired to produce a duplicate of the desired information recorded in a frame of a a microfilm by enlarging the frame and exposing a photosensitive sheet to an optical image of the enlarged desired information, some difficulty is experienced because the strip of photosensitive paper in roll form contained in a reader-printer has a predetermined width. The fact that the reader-printer contains therein only one type of a strip of photosensitive paper of a predetermined width makes it necessary to provide a specific device for use when a desired frame is being duplicated.

More specifically, the strip of photosensitive paper in roll form contained in reader-printers 1 now commercially available has a width which corresponds to the distance between the marks 2a and 2b on the screen 2.

Thus, when it is desired to produce a duplicate of a piece of information recorded in a frame which has a major axis disposed vertically as shown in FIG. 5 and FIG. 7, the operator has only to depress a duplicating button of the reader-printer. However, when the desired piece of information is recorded in a frame having a major axis disposed transversely, the enlarged picture of the information will stick out of the opposite sides of the photosensitive sheet when a duplicate is produced because the sheet has a width corresponding to the distance between the marks 2a and 2b but the enlarged picture has a width corresponding to the distance between the marks 2ao and 2bo on the screen 2.

In order to obviate this problem, it has hitherto been customary to manually operate, before depressing the duplicating button, an image rotating knob 65 (See FIG. 1) to rotate an image rotating prism so as to rotate through 90° a frame having a major axis disposed transversely and convert the same into a frame having major axis disposed vertically, so that the desired information can be enlarged and duplicated on a photosensitive sheet severed from a strip of photosensitive paper in roll form of a predetermined width.

When the strip of photosensitive paper in roll form contained in a reader-printer has a width which corresponds to the distance between the marks 2ao and 2bo on the screen 2, it is necessary to operate, before depressing the duplicating button, the knob 65 to convert a frame having a major axis disposed vertically into a frame having a major axis disposed transversely when enlarged so as to produce a duplicate of the desired information in a photosensitive sheet severed from the strip of photosensitive paper in roll form.

This problem could be obviated if a reader-printer contained therein two types of strips of photosensitive paper in roll form, one type having a width corresponding to that of an enlarged frame of a microfilm having a major axis disposed transversely and the other type having a width corresponding to that of an enlarged frame having a major axis disposed vertically, or if the reader-printer were constructed for interchangeably mounted strips of photosensitive paper in roll form of different widths. But this arrangement renders the construction of the reader-printer very complex and large in scale. Besides, it is troublesome to change the rolls of photosensitive paper each time duplication of the frame containing desired information of a microfilm is produced. Anyhow, reader-printers now commercially available each contain only one type of a strip of photosensitive paper in roll form therein.

It is troublesome manually to rotate the image rotating prism to enlarge and produce a duplicate of the frame containing desired information. It is also troublesome to restore the image rotating prism to its original position after the duplication operation is finished.

SUMMARY OF THE INVENTION

This invention has as its object the provision of a device for shifting a microfilm frame containing desired information from a position in which its major axis is disposed vertically to a position in which its major axis is disposed transversely or vice versa, when the desired frame is to be enlarged and duplicated by means of a reader-printer, by bringing a switching knob to an upright position or a horizontal position whereby image rotating prism can be automatically rotated to a selected position without requiring manual attention.

The outstanding characteristic of the invention is that the microfilm frame shifting device for a reader-printing comprises an image rotating prism rotating mechanism coupled to a mechanism for moving a movable reflector for effecting duplication of the desired frame of the microfilm from a first position to a second position for automatically rotating the image rotating prism without requiring manual attention, and means for rendering the image rotating prism rotating mechanism operative or inoperative depending on whether the major axis of the desired frame to be enlarged and duplicated is disposed vertically or transversely. The image rotating prism automatically rotates conjointly with the movement of the movable reflector if the operator only moves a change-over knob to an upright position or a horizontal position depending on whether the major axis of the desired frame is disposed vertically or transversely. As a result, the projected frame containing desired information can be made to change from a position in which its major axis is disposed vertically to a position in which its major axis is disposed transversely or vice versa, so that a duplicate of the enlarged frame containing desired information can be produced by using a photosensitive sheet provided in the reader-printer.

The device according to the invention obviates the aforementioned disadvantages of reader-printers of the prior art. The provision of the frame shifting device according to the invention does not in any way interfere with the function of shifting through any angle as desired the frame of an image enlarged and projected onto the screen by manually operating the image rotating knob 65, and does not interfere with permitting focusing of the projected image to be effected by manually operating a focusing knob.

BRIEF DESCRIPTION OF THE DRAWINGS

FIG. 2 is a central vertical sectional view of the reader-printer shown in FIG. 1;

FIG. 9 and FIG. 10 are views of the device according to the invention as seen from the left side of FIG. 3, in explanation of operation of the device.

DESCRIPTION OF A PREFERRED EMBODIMENT OF THE INVENTION

Before describing the device according to the invention in detail, one example of reader-printers for enlarging the frame of a microfilm in which desired information is stored and projecting a picture of the frame of information onto a screen or producing a duplicate thereof on a photosensitive sheet by using the device according to the invention will be outlined. The reader-printers are of the light transmission type in which a picture of the frame of desired information is projected upon a screen made of a semi-transparent material for observation. The reader-printers of this type comprise means for moving a movable reflector between a position in which an enlarged upright image of the desired information contained in a frame can be projected upon the screen and another position in which a photosensitive sheet can be exposed to an enlarged optical image of such information so as to produce a duplicate of the desired information.

Figure 1:
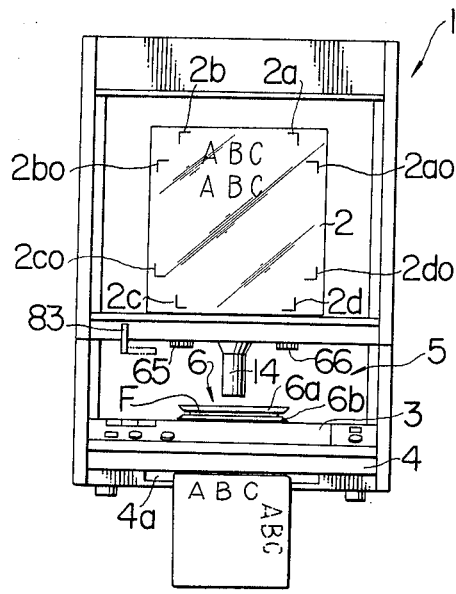
FIG. 1 is a front view of a reader-printer for microfilms in which the device according to the invention can be incorporated.

In FIG. 1 and FIG. 2, a reader-printer generally designated 1 has a screen 2 mounted in a front upper portion thereof, and a shelf portion 4 disposed beneath the screen 2 and including a slightly forwardly inclined panel 3 disposed on the upper surface of the shelf portion 4. Certain terminology will be used in the following description for convenience in reference only and will not be limiting. The words "forwardly" and "rearwardly" will designate directions in FIG. 2 to which reference is made. The word "forwardly" will refer to rightwardly in the figure while the word "rearwardly" will refer to leftwardly therein.

Formed between the shelf portion 4 and the screen 2 is a recess generally designated 5 in FIG. 2 in which is held by suitable means a microfilm support means 6 for holding a microfilm F including the desired frame of information to be projected or duplicated. The microfilm support means 6 comprises two pressing plates 6a and 6b made of glass or other transparent material and superposed one over the other with the microfilm F being interposed therebetween. Disposed beneath the two pressing plates 6a and 6b and in the shelf portion 4 is a light source means 11 comprising a light source 7, a reflector 8 and condenser lenses 9, 10. Disposed above the two pressing plates 6a and 6b is a bodytube 14 (subsequently to be described) comprising a projection lens 12 and an image rotating prism 13 disposed in optical relationship.

When the frame containing desired information of the microfilm F and held between the two pressing plates 6a and 6b is brought into alignment with an optical axis $O_1$ of the condenser lenses 9, 10 and projection lens 12, a picture of the frame containing desired information is projected on to the screen 2. More specifically, the optical axis $O_1$ of the condenser lenses 9, 10 and projection lens 12 extends upwardly and impinges on a fixed reflector 15 disposed in a forward upper portion of the reader-printer 1 shown in FIG. 2 and inclined such that the light beam from the condenser lenses 9, 10 and projection lens 12 is reflected obliquely downwardly rearwardly in FIG. 2 by the reflector 15. A movable reflector 16 which is disposed in the path of travel of the light beam reflected by the fixed reflector 15 when the former is disposed in a first position 16A shown in solid lines reflects forwardly the light beam from the fixed reflector 15 so that it may be directed to the screen 2. Thus, the projected frame containing desired information forms an enlarged image on the screen 2 for observation.

The movable reflector 16 is attached to a support plate 17 which is mounted sideways on inwardly bent marginal portions 18a and 19a (See FIG. 3) formed at free end portions of support arms 18 and 19 respectively pivotally supported near right and left side walls in the reader-printer 1. The movable reflector 16 is mounted on the upper surface of the support plate 17.

Figure 3:
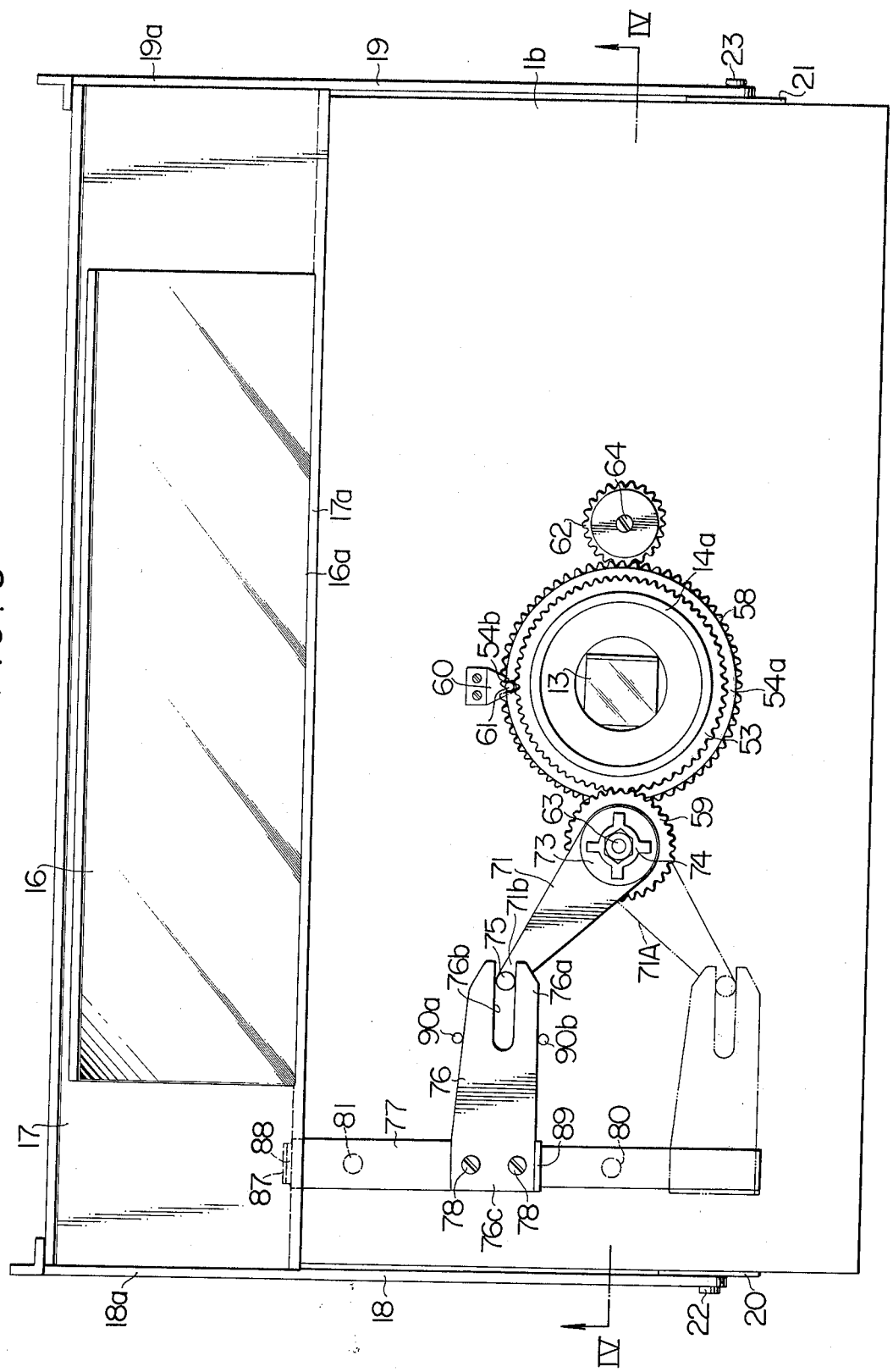
FIG. 3 iis a plan view of the device for shifting the frame containing desired information of a microfilm comprising one embodiment of the invention.

The support arms 18 and 19 have base portions 18b and 19b respectively pivotally supported by lugs 20 and 21 through shafts 22 and 23 respectively (See FIG. 3).

The support plate 17 on which the movable reflector 16 is mounted includes a lower marginal portion 17a which extends downwardly of a lower edge 16a of the movable reflector as shown in FIG. 2 and FIG. 3.

The movable reflector 16 disposed in the first position 16A in which it reflects the light beam from the fixed reflector 15 and onto the screen 2 can be moved to a second position 16B shown in dash-and-dot lines in FIG. 2 in which it is disposed out of the path of movement of the light beam reflected by the fixed reflector 15 and positioned rearwardly and in the vicinity of the screen 2. Although the movable reflector 16 is disposed in the first position 16A when a picture of the frame of the microfilm F containing desired information is to be enlarged and projected on to the screen 2, it is moved to the second position 16B when a duplicate of the enlarged picture of the frame of desired information is to be produced by directing the light beam reflected by the fixed reflector 15 toward a photosensitive sheet 24.

The mechanism for moving the movable reflector 16 from the first position 16A to the second position 16B comprises a linkage including a connector 25 and a pivotal arm 26, and a cam wheel 27 adapted to actuate the linkage. The pivotal arm 26 includes a base portion 26a pivotally supported by a shaft 28 connected to a side wall (not shown) of the reader-printer 1, and a free end portion 26b articulatedly connected to one end of the connector 25 which is articulatedly connected at the other end to a central portion of the support arm 18. The pivotal arm 26 has near its base portion 26a, a protrusion 26c at which a roller 30 is mounted and maintained in engagement with the peripheral edge of the cam wheel 27 firmly secured to a drive shaft 31 adapted to be driven by a drive (not shown) which is actuated when a duplicating button on the panel 3 is depressed and causes the cam wheel 27 to rotate through one-half of a revolution. As the cam wheel 27 rotates through this one-half of a revolution, the roller 30 is moved by the peripheral edge of the cam wheel 27 to actuate the linkage to move the movable reflector 16 from the first position 16A to the second position 16B.

Upon movement of the movable reflector to the second position 16B, the light beam $O_1$ is reflected by the fixed reflector 15 and projected onto the photosensitive sheet 24 as an exposing light beam $O_2$ so that the latter is exposed to an optical image of the information recorded in the desired frame.

The photosensitive sheet 24 is severed from a strip of photosensitive paper of a predetermined width in roll form 24a rotatably supported by a supply shaft 32 and provided with a photoconductive material layer formed on the inner surface of the strip. A leading end portion 24b of the photosensitive paper in roll form 24a normally engages a photosensitive sheet guide roller 33, extends through a pair of photosensitive sheet delivery rollers 34 and is disposed on a sheet cutting means 37 comprising a fixed cutter 35 and a movable cutter 36. The photosensitive sheet delivery rollers 34, 34 begin to rotate upon depression of the duplicating button and sheet feed instructions are given, so as to deliver the leading end portion of the strip of photosensitive paper to an electrically charging device 38.

The electrically charging device 38, which is of the so-called double charge system, comprises a charger 41 including a pair of wire electrodes 39, 39 and another charger 42 including a pair of wire electrodes 40, 40, the electrodes being disposed in spaced juxtaposed relationship so as to electrically charge the photosensitive surface of a strip of photosensitive paper as it travels between the two chargers. The photosensitive paper having its entire photosensitive surface electrically charged by the charging device 38 is forwarded to a photosensitive sheet positioning device 43 disposed in a position against which the exposing light beam $O_2$ is directed.

The photosensitive sheet positioning device 43 comprises a number of porous endless belts 48 trained about a plurality of rollers 44 to 47 and including runs forming a planar surface for receiving the exposing light beam $O_2$ incident thereon at right angles thereto, and a suction box 49 disposed in a loop formed by the endless belts 48 and formed with a multitude of ventilatory openings 49a on a surface of the box 49 disposed parallel to the runs of the belts 48 which receive the exposing light beam $O_2$ so as to draw by suction the charged photosensitive sheet toward the planar runs of the belts 48 through the ventilatory openings 49. The endless belts 48 and the suction box 49 are constructed such that the openings formed in the former and the ventilatory openings 49a formed in the latter are indexed with one another so as to apply a suction force to the photosensitive sheet disposed on the planar runs of the endless belts 48.

The strip of photosensitive paper paid out of the photosensitive paper in roll form 24a is cut into a sheet of a predetermined size by the sheet cutting means 37 when the leading end of the strip depresses a strip detection switch S1 disposed at the entrance to the sheet positioning device 43. Then, the sheet severed from the strip is delivered to the exposing position by the endless belts 48 which stops moving when the leading end of the severed sheet depresses a stop switch S2. Thus, the severed sheet is positioned in the exposing position.

Upon actuation of the stop switch S2, the cam wheel 27 is driven and at the same time a light source switch S3 is de-energized to move the movable reflector 16 out of the path of movement of the light beam reflected by the fixed reflector 15. The light source switch S3 is energized again to turn on the light source by a trigger timer (not shown) actuated when the duplicating button is depressed, so that the photosensitive sheet positioned on the photosensitive sheet positioning device 43 is exposed to an optical image of the frame containing desired information of the microfilm F as the light beam reflected by the fixed reflector 15 is thrown on to the photosensitive sheet.

Upon completion of exposing of the photosensitive sheet, the endless belts 48 are driven again and the exposed photosensitive sheet is delivered to a developing device 50 where the photosensitive sheet is developed. The developed photosensitive sheet is dried by means of a blower 41 while it is moved from the developing device 40 to a discharge port 4a formed in the front of the shelf portion 4.

An enlarged duplicate of the frame containing desired information of the microfilm F is produced instead of the frame being projected on the screen 2.

The mechanism for driving the bodytube 14 having the projection lens 12 and the image rotating prism 13 built therein will now be described with reference to FIG. 3 and FIG. 4.

Figure 4:
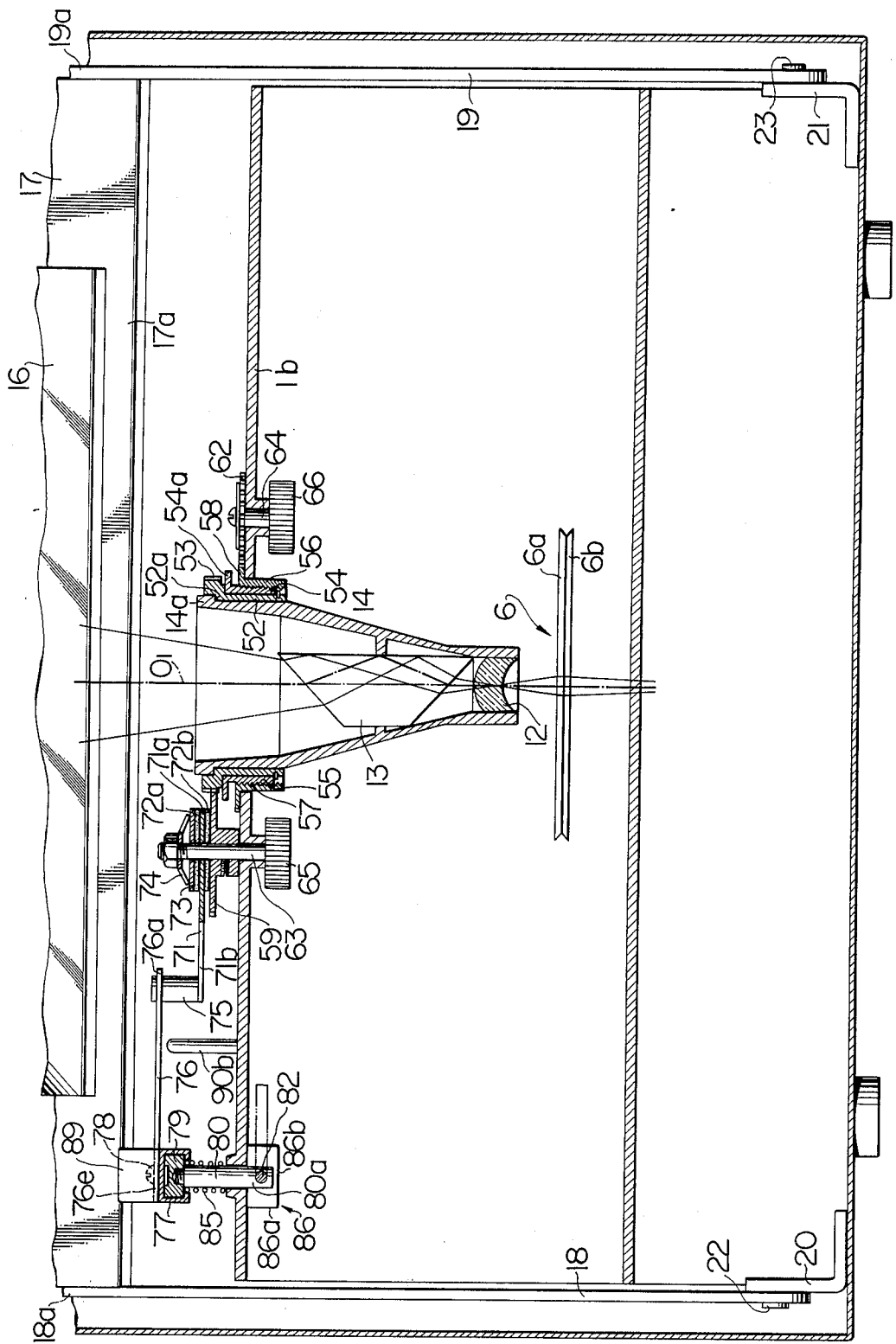
FIG. 4 is a sectional view taken along the line IV—IV of FIG. 3.

In FIG. 4, the bodytube 14 is shown as comprising the projection lens 12 and the image rotating prism 13 which is a trapezoidal prism in this embodiment. Focusing is effected when the bodytube 14 is moved up and down along the optical axis $O_1$ and shifting of the frame containing desired information of the microfilm F is effected and rotation of the projected image is effected when the bodytube 14 is angularly rotated through the optical axis $O_1$.

Also referring to FIG. 4, the bodytube 14 is formed at its upper edge with a flange 14a which is supported by an offset portion 52a formed in a rotary tube 52 so that the bodytube 14 and the rotary tube 52 may act as a unit. Formed at the outer upper peripheral edge of the rotary tube 52 is a gear 53. The rotary tube 52 is inserted in an externally threaded tube 54 with the gear 53 being supported by a flange 54a formed at the upper edge of the externally threaded tube 54, so that the rotary tube 52 is supported by the externally threaded tube 54. A threaded portion 55 formed on the external surface of the tube 54 is maintained in meshing engagement with a threaded portion 57 formed on the internal surface of the receiving tube 56 which is rotatably fitted in an immovable plate 1b and formed with a gear 58 at a flange formed at the outer upper peripheral edge of the receiving tube 56. The immovable plate 1b is a portion of a side wall which defines the recess 5 in the front portion of the reader-printer 1.

The flange 54a is formed at one portion thereof with a cutout 54b, as shown in FIG. 3, for receiving therein a guide pin 61 affixed to the immovable plate 1b by a metallic member 60 for causing the bodytube 14 to move in a straightline when moved up and down. Thus, when the receiving tube 56 is rotated about the optical axis $O_1$ by the gear 58, the threaded tube 54 only moves up and down along the optical axis $O_1$.

A bodytube rotating gear 59 is maintained in meshing engagement with gear 53, and a bodytube vertically moving gear 62 is maintained in meshing engagement with gear 62. The gears 59 and 62 are supported by rotary shafts 63 and 64 respectively which extend through the immovable plate 1b and are supported for rotation relative thereto. The image rotating knob 65 is attached to the lower end of the rotary shaft 63 extending through the immovable plate 1b into the recess 5, and a focusing knob 66 is secured to the lower end of the rotary shaft 64.

The body tube 14 and the mechanism for driving the same are constructed as aforementioned. When it is desired to effected focusing of a picture of the frame containing desired information of the microfilm F, the operator has only to turn the focusing knob 66. Upon turning knob 66, the receiving tube 56 is rotated about the optical axis $O_1$ by gears 62 and 58 meshing with each other, so that the externally threaded tube 54 is moved up and down along the optical axis $O_1$. This causes the bodytube 14 to move up and down along optical axis $O_1$ too, whereby focusing can be effected.

When it is desired to shift the frame containing desired information of the microfilm F or change it from a position in which is major axis is disposed vertically to a position in which its major axis is disposed horizontally or vice versa when a picture of the enlarged frame of the microfilm is projected on to the screen 2 or when its duplicate is produced, the operator has only to turn the image rotating knob 65. Upon turning knob 65, the rotary tube 52 is rotated by gears 59 and 53 meshing with each other, so that the bodytube 14 rotates about the optical axis $O_1$. This causes the image rotating prism 13 and the projection lens 12 to rotate about the optical axis $O_1$.

The trapezoidal prism which is used as the image rotating prism 13 in this embodiment is such that when it is rotated the projected image is rotated through an angle which is two times as large as the angle through which the trapezoidal prism is rotated. Thus, when the prism 13 is rotated through 45° about the optical axis $O_1$, the image projected on to the screen 2 is shifted through 90°. Thus, the frame of a microfilm whose major axis is disposed vertically is changed into a position in which the major axis is disposed transversely when enlarged and thrown upon the screen.

It will be appreciated that by turning the image rotating knob 65 it is possible to shift the frame through any angle as desired when it is enlarged and projected upon the screen 2.

The reader-printer 1 in which the device according to the invention can have application is constructed as aformentioned, and the strip of photosensitive sheet in roll form 24a contained therein has a width which is similar to the distance between the marks 2a and 2b on the screen 2 as shown in FIG. 1. As shown in FIG. 3 and FIG. 4, a pivotal arm 71 is rotatably mounted at its base 71a on an upper end portion of the rotary shaft 63 for rotating gear 59 which has the image rotating knob 65 secured to its lower end. The base 71a of the pivotal arm 71 is held between friction plates 72a and 62b which are mounted on the rotary shaft 63. Supported on the upper surface of the upper friction plate 72a is a protection plate 73 which is also mounted on the rotary shaft 63 and urged to move downwardly by the biasing force of a plate spring 74 also mounted on the rotary shaft 63. Thus, the rotary shaft 63 and gear 59 are maintained in frictional engagement with the pivotal arm 71, so that when the pivotal arm 71 moves in pivotal movement gear 59 also rotates.

The pivotal arm 71 includes a free end portion which extends toward one side wall of the reader-printer 1 and has a pin 75 planted at its forward end 71b and held between Y-shaped forward end portions 76a, 76a of a arm 76 which is affixed at its base 76c to the upper surface of a channel-shaped slider 77 by screws 78, 78. The channel-shaped slider 77 slidably rises on a guide rail 79 which is oriented in a direction in which the movable reflector 16 travels when it moves from the first position to the second position.

Two vertical shafts 80 and 81 extend through the guide rail 79 at right angles thereto and are secured thereto. They also extend downwardly through the immovable plate 1b. Portions 80a and 81a (See FIG. 9) of the shafts 80 and 81 which are disposed below the immovable plate 1b has a connecting rod 82 loosely extending therethrough so as to connect the two vertical shafts 80 and 61 at their lower end portions. The connecting rod 82 extends from the rear to the front of the reader-printer 1 as shown in FIG. 9 and FIG. 10 and has an end portion 82a which extends forwardly from the front side of the reader-printer 1 for mounting thereon a change-over knob 83 thereon.

Extension springs 84 and 85 are mounted on the vertical shafts 81 and 80 respectively and disposed between the guide rail 79 and the immovable plate 1b so as to normally urge the guide rail 79 to move upwardly by their biasing forces. The upward movement of the guide rail 79 by the biasing forces of the expansion springs 84 and 85 is controlled by a cam 86 affixed to the connecting rod 82. More specifically, the cam 86 which is disposed on the connecting rod 82 and interposed between the vertical shafts 81 and 80 is in the form of a rectangular parallelepiped having a rectangular cross-section and the connecting rod 82 extending through the center major axis of the cam 86. Thus, the cam 86 has two opposite operation sides 86, 86a disposed symmetrically with respect to the connecting rod and two opposite operation sides 86b, 86b also disposed symmetrically with respect to the connecting rod 82, with the distance between each operation side 86a and the connecting rod 82 being greater than the distance between each operation side 86b and the connecting rod 82. That is, the cam 86 has four operation sides. The cam 86 being constructed as aforementioned, either one of the operation sides 86a remote from the connecting rod 82 or one of the operation sides 86b nearer to the connecting rod 82 is brought into contact with the under surface of the immovable plate 1b by the biasing force of the springs 84 and 85 so as to control the distance between the guide rail 79 and the immovable plate 1b.

Figure 10:
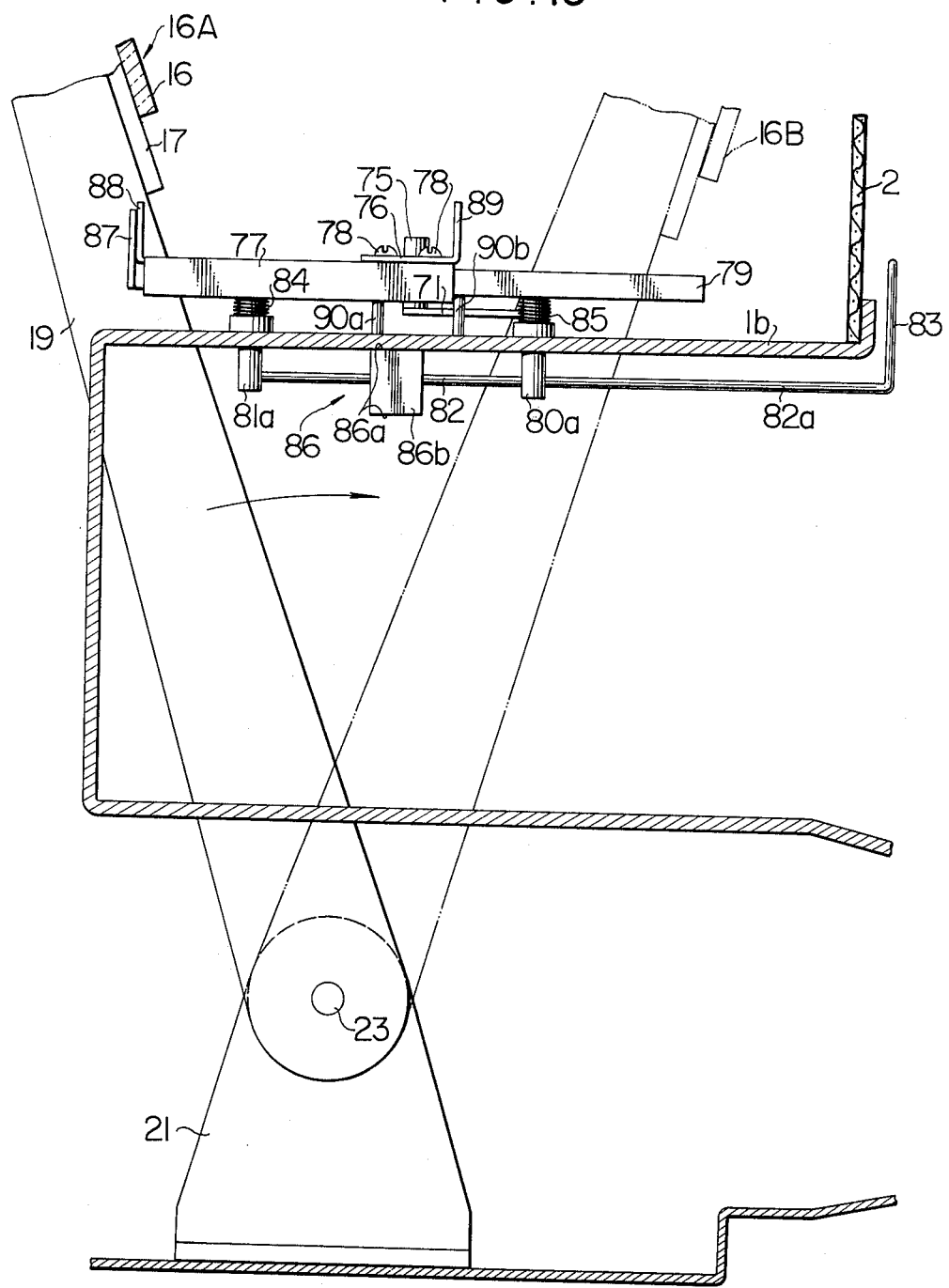

When one of the sides 86a, 86a of the cam 86 remote from the connecting rod 82 is brought into contact with the immovable plate 1b, the change-over knob 83 is in an upright position as shown in FIG. 10 and the guide rail 79 is moved downwardly into a lower position so that the distance between the guide rail 79 and the immovable plate 1b is reduced. If the change-over knob 83 is turned through 90° into a horizontal position as shown in FIG. 9, one of the operation sides 86b, 86b of the cam 86 nearer to the connecting rod 82 will be brought into contact with the immovable plate 1b and the guide rail 79 will be moved upwardly into a higher position by the biasing forces of the springs 84 and 85, so that the distance between the guide rail 79 and the immovable plate 1b is increased.

A stop plate 87 is attached, as shown in FIG. 9 and FIG. 10, to the rear end of the guide rail 79 which moves up and down as aforementoned. The stop plate 87 serves to stop the rearward movement of the channel-shaped slider 77 adapted to slide on the guide rail 79. The channel-shaped slider 77 has affixed thereto a plurality of vertical projections 88 and 89 which move into the path of travel of the movable reflector 16, or more specifically of the support plate 17 for the reflector 16, between its first and second positions 16A and 16B, when the guide rails 79 is moved upwardly to its upper position.

One projection 88 is formed by an upwardly bent rear end portion of the channel-shaped slider 77, and its upper edge is positioned against the back of the lower marginal portion 17a of the support plate 17 as shown in FIG. 9. The other projection 89 is formed by an upwardly bent forward side portion of the arm 76. The two projections 88 and 89 move downwardly when the guide rail 79 moves downwardly to its lower position, so that they move out of the path of movement of the support plate 17 as the movable reflector 16 moves between its first and second positions 16A and 16B.

When the guide rail 79 is moved downwardly to its lower position, the arm 76 is held between stop pins 90a and 90b affixed to the immovable plate 1b, so that the arm 76 and hence the channel-shaped slider 77 is kept from moving in sliding movement. By this arrangement, the movement of the arm 67 is prevented when the image rotating knob 65 is manually turned.

Figure 6:
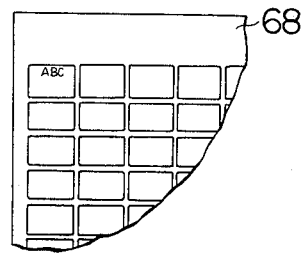
FIG. 6 and FIG. 8 are fragmentary front views of a microfiche and microfilm respectively which include frames each having a major axis disposed transversely.
Figure 8:
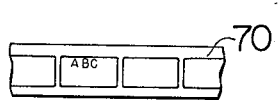

The device according to the invention constructed as aforementioned operates as will presently be described in detail. The operation of the device will be described with reference to an embodiment in which the frame containing desired information of the microfilm F and having a major axis disposed transversely as shown in FIG. 6 and FIG. 8 is enlarged and reproduced on a photosensitive sheet by changing the enlarged frame to a position in which its major axis is disposed vertically. In performing this operation, the operator has only to move the change-over knob 83 from its upright position to its horizontal position as shown in FIG. 9 because the major axis of the frame to be projected is disposed transversely.

Upon moving the change-over knob 83 to its lying position, the connecting rod 82 angularly rotates through 90° and one of the operation sides 86b, 86b of the cam 86 which are nearer to the connecting rod 82 than the operation sides 86a, 86a is brought into contact with the immovable plate 1b. This causes the guide rail 79 to be moved upwardly to its upper position by the biasing force of the springs 84 and 85, with a result that the distance between the guide rail 79 and the immovable plate 1b is increased (See FIG. 4 and FIG. 9). If the duplicating button (not shown) is depressed at this time, then the projection light source is temporarily de-actuated and the movable reflector 16 moves from its first position 16A to its second position 16B. When this movement of the reflector 16 takes place, the projection 89 is pushed and moved by the lower marginal portion 17a of the supporting plate 17 for the movable reflector 16 as shown in FIG. 9, thereby causing the channel-shaped slider 77 to slide forwardly toward the screen 2 along the guide rail 79 and the projection 88 to move to a position designated 88A. The forward movement of the channel-shaped slider 77 causes edges 76b of the forks 76a, 76a of the arm 76 to push and move the pin 75, so that the pivotal arm 71 moves counter clockwise about the vertical shaft 83 in FIG. 3 from a solid line position to a dash-and-dot line position 71A. The counter clockwise movement of the pivotal arm 71 causes, through the friction member 72a and 72b, the vertical shaft 63 and gear 59 to rotate. This rotates gear 53 which rotates the bodytube 14, thereby rotating the image rotating prism 13 clockwise through 45° in FIG. 3. The device is constructed such that the movement of the arm 76 from its solid line position to its dash-and-dot line position in FIG. 3 causes the image rotating prism 13 to rotate through 45°.

By the time the image rotating prism 13 rotates, the movable reflector 16 has already reached its second position 16B disposed immediately behind the screen 2. Arrival of the reflector 16 at its second position 16B actuates the projection light source again, so that an optical image of the desired frame of the microfilm F is shifted through 90° by the image rotating prism 13 before being projected on to the fixed reflector 15. The optical image reflected by the fixed reflector 15 is projected upon the photosensitive sheet 24 on the belts 48 (See FIG. 2) to expose the photosensitive sheet. Upon completion of the exposing operation, the cam wheel 27 (See FIG. 2) rotates, and the movable reflector 16 is moved back from its second position 16B to its first position 16A by the biasing force of a return spring (not shown).

When the movable reflector moves back from its second position 16B to its first position 16A, the back of the lower marginal portion 17a of the supporting plate 17 for the movable reflector 16 strikes the projection 88A of the channel-shaped slider 77 in its forward position and moves the projection backwardly, so that the channel-shaped slider 77 moves from its forward position to its rearward position. The rearward movement of the slider 77 results in the arm 76 being moved through the pin 65, so that the pivotal arm 71 disposed in the dash-and-dot line position 71A is moved clockwise about the vertical shaft 63 to its solid line position. The clockwise movement of the pivotal arm 71 causes, through the friction members 72a and 72b, the vertical shaft 63 and gear 59 to rotate. This rotates gear 53 so as to cause the bodytube 14 to rotate counter clockwise in FIG. 3 to its original position. As a result, the image rotating prism 13 is rotated through 45° and returned to its original position. By this time, the movable reflector 16 has returned to its first position 16A as the projection 88 abuts against the stopper plate 87.

Figure 5:
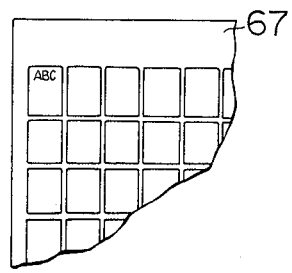
FIG. 5 and FIG. 7 are fragmentary front views of a microfiche and a microfilm respectively which include frames each having a major axis disposed vertically.
Figure 7:
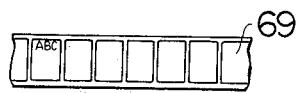

In projecting and producing an enlarged duplicate of the frame containing desired information of the microfilm F which has a major axis disposed vertically as shown in FIG. 5 and FIG. 7, the operator has only to move the change-over knob 83 from its horizontal position to its upright position. Upon moving the change-over knob 83 to its upright position, the connecting rod 82 angularly rotates through 90° and one of the operation sides 86a, 86a of the cam 86 which are farther from the connecting rod 82 than the operation sides 86b, 86b is brought into contact with the immovable plate 1b. This causes the guide rail 79 to move downwardly against the biasing forces of springs 84 and 85, with a result that the distance between the immovable plate 1b and the guide rail 79 iis reduced as shown in FIG. 10.

The downward movement of the guide rail 79 results in the downward movement of the channel-shaped slider 77, so that the projections 88 and 89 move out of the path of travel of the support plate 17 for the movable reflector 16 as shown in FIG. 10. Depression of the duplicating button at this time interrupts the emanaton of light from the projection light source and permits the movable reflector to move from its first position 16A to its second position 16B. Since the projection 89 is out of the path of travel of the support plate 17 for the movable reflector 16, the image rotating prism 13 is not rotated. Thus, the frame containing desired information of the microfilm F is not shifted and an optical image of the frame is formed on the photosensitive sheet to expose the same after being enlarged. When the movable reflector 16 returns from its second position 16b to its first position 16A after completion of exposition, no influence is exerted on the image rotating prism 13 because the projection 88 is out of the path of travel of the support plate 17 for the movable reflector 16.

While the embodiment of the invention has been described as being incorporated in a reader-printer in which is provided a strip of photosensitive paper in roll form having a width corresponding to the distance between the marks 2a and 2b (See FIG. 1) on the screen 2, it will be evident that the invention can be incorporated in a reader-printer having a strip of photosensitive sheet of a width corresponding to the distance between the marks 2ao and 2bo (See FIG. 1) on the screen 2. If this is the case, the arrangement of the cam 86 has only to be changed such that one of the operation sides 86a, 86a which are farther from the connecting rod 82 than the operation sides 86b, 86b is brought into contact with the immovable plate 1b when the change-over knob 83 is brought to its lying position.

The cam 86 has been shown and described as being in the form of a rectangular parallelepiped. It is to be understood, however, that the invention is not limited to this specific form of cam and that the cam can be any form as desired, with a cam of the eccentric form being one of the cams of other forms.

What is claimed is:

1. A reader-printer for microfilm frames having a screen for viewing a selected frame projected thereon and a device for copying a selected frame projected thereon, said copying device having a copying plane, comprising:

means for forming a light image of a selected microfilm frame and for projecting said image along a first optical axis;

a first reflector disposed on said first optical axis and reflecting the image projected along the first axis onto the copying plane of the copying device along a second optical axis;

a second reflector movable between a copying position in which it does not intersect said second optical axis and allows the light image to be projected from the first reflector onto the copying plane of the copying device and a viewing position in which said second reflector is in the path of the second optical axis and reflects the image projected therealong by the first reflector onto the viewing screen for viewing thereof;

first selector means manually movable between a viewing position and a copying position;

means responsive to moving the first selector means to the viewing position thereof to place said second reflector in the viewing position thereof and responsive to moving the first selector means to the copying position thereof to place the second reflector in the copying position thereof;

an image rotating prism disposed on said first optical path and movable between a first position to cause a defined edge of the selected frame to be along a horizontal direction of the viewing screen when projected thereon and along a horizontal direction of the copying plane when projected thereon and a second position to cause said defined edge of the frame to be along a vertical direction of the viewing screen when projected thereon and along a vertical direction of the copying plane when projected thereon; and means responsive to moving the first selector means to its copying position for placing the image rotating prism to a selected one of its first and second position regardless of the position of the image rotating prism during viewing of the selected microfilm frame, whereby an elongated microfilm frame may be viewed on the screen with its long dimension either horizontal or vertical, but is always copied with its long dimension in a selected direction with respect to the copying device so that the same width copying paper may be used for all microfilm frames.

2. A frame shifting device for a reader-printer for a microfilm comprising a movable reflector adapted to move between a first position in which it reflects a light beam emanating from a light source for projecting a picture of the frame containing desired information of the microfilm upon a screen for observation and a second position in which it is out of the path of travel of the light beam to permit the light beam to be incident on a photosensitive sheet to expose the latter to an optical image of the desired information contained in the frame, and an image rotating prism capable of being rotated and disposed in the path of travel of said light beam so as to change the image of the frame containing desired information from a position in which its major axis is disposed vertically to a position in which its major axis is disposed transversely or vice versa when the enlarged frame is projected upon the screen, said frame shifting device comprising an image rotating prism rotating mechanism coupled to a mechanism for moving said movable reflector from said first position to said second position and automatically rotating said image rotating prism, and means for rendering said image rotating prism rotating mechanism operative or inoperative depending on whether the major axis of the desired frame is disposed horizontally or vertically, wherein said image rotating prism rotating mechanism comprises a first arm adapted to move in the same direction said movable reflector when the latter moves from its first position to its second position, a pivotal arm maintained in engagement with said first arm and adapted to move in pivotal movement when said first arm moves, a first gear connected to said pivotal arm and adapted to rotate as said pivotal arm moves in pivotal movement, and a second gear maintained in meshing engagement with said first gear for rotating a body-tube housing therein a projection lens and said image rotating prism.

3. A frame shifting device for a reader-printer for a microfilm comprising a movable reflector adapted to move between a first position in which it reflects a light beam emanating from a light source for projecting a picture of the frame containing desired information of the microfilm upon a screen for observation and a second position in which it is out of the path of travel of the light beam to permit the light beam to be incident on a photosensitive sheet to expose the latter to an optical image of the desired information contained in the frame, and an image rotating prism capable of being rotated and disposed in the path of travel of said light beam so as to change the image of the frame containing desired information from a position in which its major axis is disposed vertically to a position in which its major axis is disposed transversely or vice versa when the enlarged frame is projected upon the screen, said frame shifting device comprising an image rotating prism rotating mechanism coupled to a mechanism for moving said movable reflector from said first position to said second position and automatically rotating said image rotating prism, and means for rendering said image rotating prism rotating mechanism operative or inoperative depending on whether the major axis of the desired frame is disposed horizontally or vertically, wherein said means for rendering said image rotating prism rotating mechanism operative or inoperative comprises a vertical projection formed in an arm adapted to move in the same direction as said movable reflector and adapted to move onto and out of the path of travel of said movable reflector from its first position to its second position, a vertical projection formed in a channel-shaped slider to which said arm is affixed, a cam adapted to move said channel-shaped slider upwardly and downwardly between two positions, and an image rotating change-over knob for moving said cam according to the direction in which the major axis of the frame containing desired information is disposed.

4. A frame shifting device according to claim 3 wherein said channel-shaped slider is adapted to move in sliding movement on a guide rail disposed in the direction of movement of said movable reflector.

* * * * *